(12) United States Patent
Cai et al.

(10) Patent No.: US 7,860,165 B2
(45) Date of Patent: Dec. 28, 2010

(54) FRAMEWORK FOR FINE-GRANULAR COMPUTATIONAL-COMPLEXITY SCALABLE MOTION ESTIMATION

(75) Inventors: Hua Cai, Beijing (CN); Jiang Li, Beijing (CN)

(73) Assignee: Microsoft Corporation, Redmond, WA (US)

(*) Notice: Subject to any disclaimer, the term of this patent is extended or adjusted under 35 U.S.C. 154(b) by 1572 days.

(21) Appl. No.: 11/133,572

(22) Filed: May 20, 2005

(65) Prior Publication Data

US 2006/0262852 A1    Nov. 23, 2006

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.16

(58) Field of Classification Search .................. None
See application file for complete search history.

(56) References Cited

U.S. PATENT DOCUMENTS

| | | | | |
|---|---|---|---|---|
| 4,992,869 A | * | 2/1991 | Samad et al. | 348/451 |
| 5,699,129 A | * | 12/1997 | Tayama | 348/699 |
| 6,128,047 A | * | 10/2000 | Chang et al. | 348/699 |
| 6,859,494 B2 | * | 2/2005 | Panusopone et al. | 375/240.16 |

OTHER PUBLICATIONS

Li, R., Zeng, B., and Liou, M.L. "A new three-step search algorithm for block motion estimation," IEEE Transactions on Circuits and Systems for Video Technology, Aug. 1994, pp. 438-442, vol. 4, No. 4.
Zhu, S. and Ma, K.K., "A New Diamond Search Algorithm for Fast Block-Matching Motion Estimation," IEEE Transactions on Image Processing, Feb. 2000, pp. 287-290, vol. 9, No. 2.
Tourapis, A.M, Au, O.C., and Liou, M.L., "Highly Efficient Predictive Zonal Algorithms for Fast Block-Matching Motion Estimation," IEEE Transactions on Circuits and Systems for Video Technology, Oct. 2002, pp. 934-947, vol. 12, No. 10.
Chimienti, A., Ferraris, C., and Pau, D., "A Complexity-Bounded Motion Estimation Algorithm," IEEE Transactions on Image Processing, Apr. 2002, pp. 387-392, vol. 11, No. 4.
Lengwehasatit, K. and Ortega, A., "Computationally scalable partial distance based fast search motion estimation," IEEE Proceeding of International Conference on Image Processing, Sep. 2000, pp. 824-827, vol. 1.
Mietens, S., De With, P.H.N., and Hentschel, C. "Computational-Complexity Scalable Motion Estimation for Mobile MPEG Encoding," IEEE Transactions on Consumer Electronics, Feb. 2004, pp. 281-291, vol. 50, No. 1.

* cited by examiner

*Primary Examiner*—Nhon T Diep
(74) *Attorney, Agent, or Firm*—Lee & Hayes, PLLC

(57) ABSTRACT

Motion-compensated video coding that employs fine-granular computational complexity scalable motion estimation is described. The scalable motion estimation technique adapts to varying computational limitations of the device performing the video coding technique. The scalable motion estimation technique calculates a predicted priority for each macroblock in a frame and identifies a set of macroblocks based on the predicted priority. A pass is then performed on each macroblock within the set. The pass checks a set of candidate motion vectors for each macroblock in the set and determines a new starting point for the next pass of the macroblocks during processing of the same frame. The predicted priority for each macroblock within the set of macroblocks is re-calculated and the process repeats by identifying another set of macroblocks and performing a pass on them. These repeats until a computation limit associated with the device performing the passes has been reached.

18 Claims, 8 Drawing Sheets

FRAMEWORK FOR FINE-GRANULAR COMPUTATIONAL-COMPLEXITY SCALABLE MOTION ESTIMATION

TECHNICAL FIELD

This disclosure relates to video coding, and particularly, to video coding that uses motion estimation.

BACKGROUND

Real-time video has become increasingly popular to users. In order to achieve real-time video, computational intensive video coding techniques have been developed to compress the video. One common type of video compression is a motion-compensation-based video coding scheme. This type of video compression is used in coding standards such as MPEG-1, MPEG-2, MPEG-4, H.261, H.263, and H.264.

These motion-compensation-based video coding schemes have been quite successful in providing real-time video conferencing capabilities on personal computers. However, the coding schemes are too computational complex for operating on mobile devices, such as handheld computers, cellular phones with built in digital cameras, and the like. The mobile devices do not have sufficient computation power, battery power, and memory for processing these real-time video coding schemes.

Most of the complexity in these video coding schemes is attributed to a process called motion estimation. In general, motion estimation removes temporal (i.e., time) redundancy between video frames. Video frames are divided into several macroblocks, where a macroblock represents an N×N array of pixels (e.g., 16 pixels by 16 pixels). The temporal redundancy is removed by computing a motion vector for each macroblock. The motion vector represents a translational displacement of the macroblock between frames. In other words, each motion vector describes the distance that a macroblock has moved from a previous frame and the direction in which the macroblock has moved. The motion vectors for the macroblocks are then transmitted in the video stream instead of the entire macroblock, thereby reducing the amount of data in the video stream.

There have been significant advances in fast motion estimation techniques that reduce the computational complexity of determining motion vectors. Some of these fast motion estimation techniques are described in the following articles:

R. Li, B. Zeng, and M. L. Liou, "A new three-step search algorithm for block motion estimation," *IEEE Transactions on Circuits and Systems for Video Technology*, vol. 4, no. 4, pp. 438-442, August 1994;

S. Zhu and K. K. Ma, "A new diamond search algorithm for fast block-matching motion estimation," *IEEE Transactions on Image Processing*, vol. 9, no. 2, pp. 287-290, February 2000;

A. M. Tourapis, O. C. Au, and M. L. Liou, "Highly efficient predictive zonal algorithms for fast block-matching motion estimation," *IEEE Transactions on Circuits and Systems for Video Technology*, vol. 12, no. 10, pp. 934-947, October 2002; and A. Chimienti, C. Ferraris, and D. Pau, "A complexity-bounded motion estimation algorithm," *IEEE Transactions on Image Processing*, vol. 11, no. 4, pp. 387-392, April 2002.

There has also been some development in computational-complexity scalable motion estimation techniques that are directed at further reducing the complexity of fast motion estimation. Some of these computational-complexity scalable motion estimation techniques are described in the following articles:

K. Lengwehasatit and A. Ortega, "Computationally scalable partial distance based fast search motion estimation," *Proceeding of International Conference on Image Processing*, vol. 1, pp. 824-827, September 2000; and S. Mietens, P. H. N. de With, and C. Hentschel, "Computational-complexity scalable motion estimation for mobile MPEG encoding," *IEEE Transactions on Consumer Electronics*, vol. 50, no. 1, pp. 281-291, February 2004.

Even with these advances, there is still a need for an improved motion estimation technique that is scalable based on the available computation resources of a device.

SUMMARY

Motion-compensated video coding that employs fine-granular computational-complexity scalable motion estimation is described. The scalable motion estimation technique adapts to varying computational limitations of the device performing the video coding technique. The scalable motion estimation technique calculates a predicted priority for each macroblock in a frame and identifies a set of macroblocks based on the predicted priority. A pass is then performed on each macroblock within the set. The pass checks a set of candidate motion vectors for each macroblock in the set and determines a new starting point for the next pass of the macroblocks during processing of the same frame. The predicted priority for each macroblock within the set of macroblocks is re-calculated and the process repeats by identifying another set of macroblocks and performing a pass on them. These repeats until a computation limit associated with the device performing the passes has been reached.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to video coding techniques that employ motion estimation. The present motion estimation technique adapts to varying computational limitations of the device performing the video coding technique. In overview, the present motion estimation technique implements a fine-granular computational-complexity scalable motion estimation process that determines a number of passes for identifying motion vectors for each macroblock. The number of passes may be the same for each macroblock or may be based on a predicted priority for each macroblock. The present motion estimation technique is scalable in that it offers coding efficiency based on the computational power of the device. It also offers fine-granularity between macroblocks when calculating motion vectors for the macroblocks. For example, a macroblock that has a large degree of distortion may be given more computation time to determine a suitable motion vector than a macroblock with minimal distortion. These and other advantages will become clear after reading the following detailed description.

The following description first describes an exemplary system architecture for encoding video data. Next, the description explains exemplary implementations of a fine-granular computational-complexity scalable motion estimation process. Lastly, different implementations of the present motion estimation technique are compared with a benchmark to illustrate their coding efficiency.

Exemplary System Architecture

Figure 1:
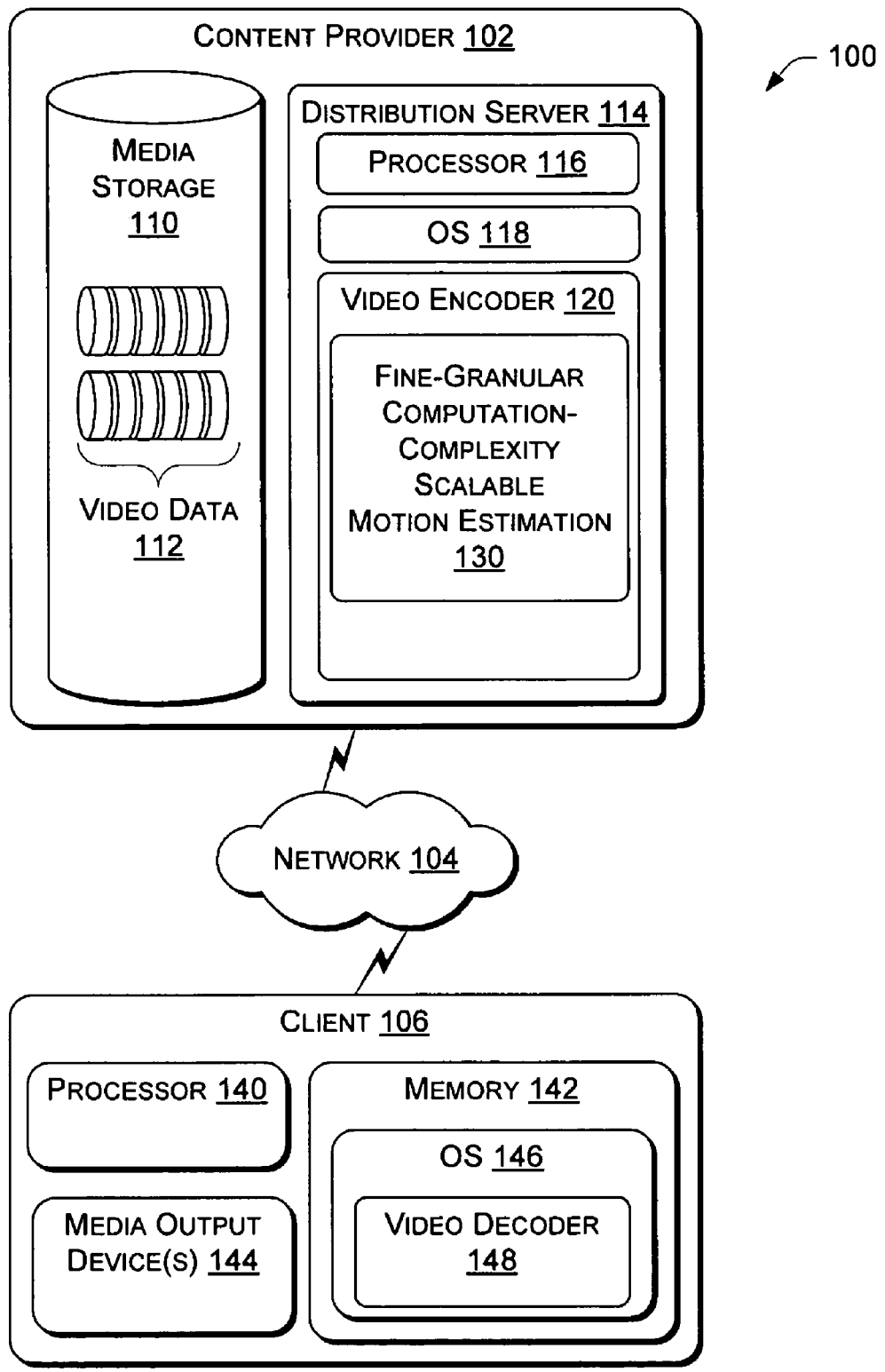
FIG. 1 illustrates an exemplary media distribution system in which a video coder using fine-granular computational-complexity scalable motion estimation may be implemented.

FIG. 1 illustrates an exemplary media distribution system 100 in which a video coder using fine-granular computational-complexity scalable motion estimation may be implemented. The media distribution system 100 includes a content producer/provider 102 that produces and/or distributes media content over a network 104 to a client 106. The network is representative of many different types of networks, including the Internet, a local area network (LAN), a wide area network (WAN), a storage area network (SAN), cable network, and wireless networks (e.g., satellite, cellular, RF, etc.).

The content producer/provider 102 may be implemented in numerous ways, such as a mobile device configured to store, process, and distribute media content. The content producer/provider 102 has media storage 110 to store digital content, including video data 112. Alternatively, the video content may be captured real-time. The content producer/provider 102 also has a distribution server 114 to encode the media and distribute it over the network 104. The server 114 has a processor 116, an operating system 118, and a video encoder 120. The video encoder 120 may be implemented in software, firmware, and/or hardware. The software includes computer-readable medium storing computer-executable instructions that are executed on the processor 116 to perform acts. The encoder 120 is shown as a separate standalone module for discussion purposes, but may be constructed as part of the processor 116 or incorporated into operating system 118 or other applications (not shown).

The video encoder 120 encodes the video data 112 using a motion-estimation-based coding scheme. Motion estimation-based coding scheme refers to a scheme which identifies macroblocks that are moving from frame to frame. For each of these moving macroblocks, a motion vector is obtained that describes the macroblocks movement from its previous frame to its current frame. The motion vector is two dimensional, with (x, y) coordinates, and describes a shift length and a direction. Shift length defines how much the macroblock has moved from the previous frame, and the direction indicates in which direction the macroblock has moved. For the present motion-estimation technique, the encoder 120 determines the motion vectors using a fine-granular computational-complexity scalable motion estimation technique. Thus, the video encoder 120 includes a fine-granular computational-complexity scalable motion estimation module 130. Briefly, the fine-granular computational-complexity scalable motion estimation module 130 implements motion estimation in a manner that is scalable based on the computational resources available on the content provider 102.

The client 106 is equipped with a processor 140, a memory 142, and one or more media output devices 144. The memory 142 stores an operating system 146 that executes on the processor 140. The operating system 146 implements a client-side video decoder 148 to decode the video. Following decoding, the client stores the video in memory and/or plays the video via the media output devices 144. The client 106 may be embodied in many different ways, including as a mobile device, a computer, an entertainment device, a set-top box, a television, one or more application specific integrated circuits (ASIC), and so forth. The memory includes computer-readable medium storing computer-executable instructions that are executed on the processor 140 to perform acts.

In one illustrative example, content provider 102 and client 106 may both be mobile devices engaged in a real-time video communication session over a wireless network. For this example, content provider 102 and client would each have the video encoder 120 and video decoder 148.

Fine-Granular Computational-Complexity Scalable Motion Estimation Process

Figure 2:
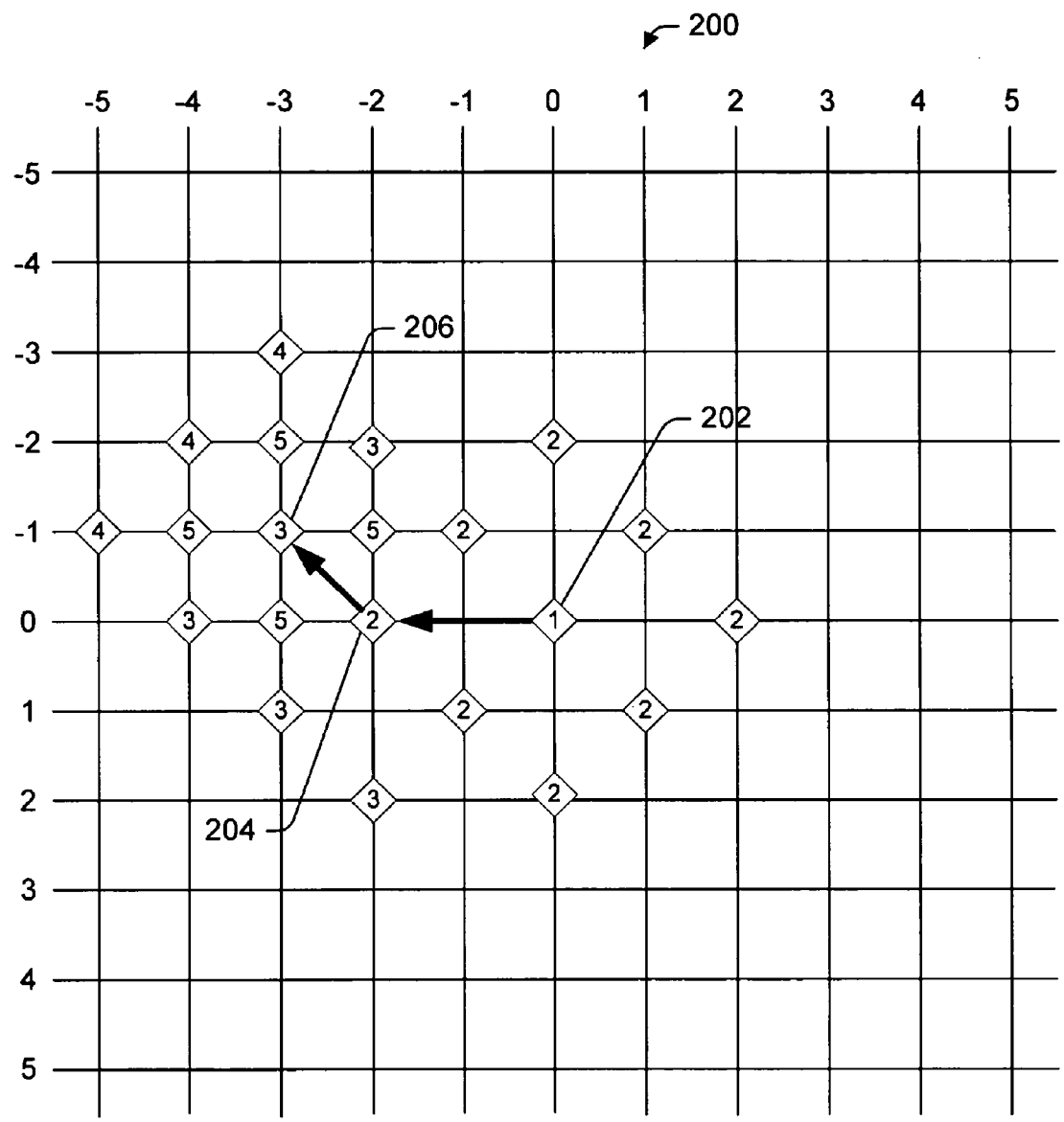
FIG. 2 is a pixel grid that illustrates a search strategy for determining a motion vector during the present fine-granular computational-complexity scalable motion estimation where the search strategy is partitioned into multiple search passes so that the search can be stopped at any pass.
Figure 2:
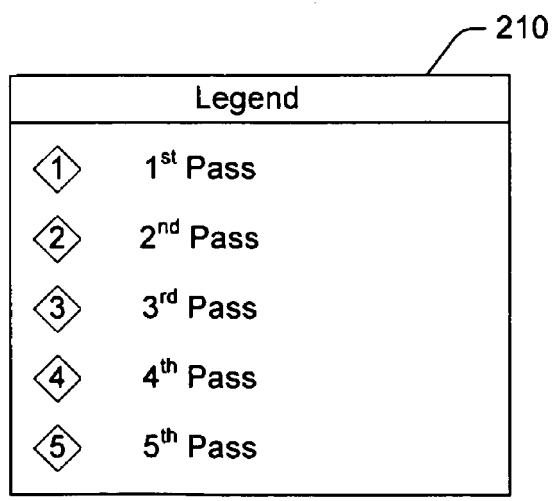

FIG. 2 is a pixel grid 200 that illustrates a search strategy for determining a motion vector for one macroblock during the present fine-granular computational-complexity scalable motion estimation process. The search strategy is partitioned into multiple search passes so that the search can be stopped at any pass. Each search pass is labeled with a number representing the number of the pass (e.g., $1^{st}$ pass is represented with a "1" within a diamond) as shown in legend 210. The pixel grid represents a search window having several search points for one macroblock. The search points are pixels in the search window. For example, for a certain macroblock with upper left coordinate (0,0), the search window may be a rectangular box (−16, −16, 16, 16). Any pixel within this rectangular box may be a search point (i.e., checking point) for the macroblock. The search window may include N×M pixels (e.g., 32×32 pixels). Typically, N and M are the same number, but it is not required.

In overview, the motion estimation process determines how the pixels in the macroblock have moved from one frame to the next. The motion vector describes this movement. For purposes of this disclosure, the term "pixel" is used throughout to mean a picture element, and can be used interchangeably with the term "pel", as the terms are intended to mean the same thing. Each pixel represents a potential check point at which the motion estimation process makes a determination whether that check point is the best position for the motion vector.

The motion estimation process begins at check point (0,0) (i.e., pixel 202) which corresponds to the location of the macroblock in the previous frame. If pixel 202 is determined to be the best motion vector for the macroblock in the current frame, this means that the macroblock did not have any motion between the two frames. However, if the distortion between the previous frame and the current frame is greater than a certain threshold, the motion estimation process continues checking surrounding check points (i.e., check points designated with a two inside a diamond). The actual check points that are checked in the second pass depend on the type of fast motion estimation technique that is being used.

For each pass, one check point is determined to be the best position for the motion vector. For example, in pass two, check point 204 is determined to be the best position for the motion vector. If the distortion at this new check point 204 is still not within a certain threshold, another pass is performed. Check points that have already been check during a previous pass are not checked again during a subsequent pass. In traditional motion estimation techniques, this process continues until the best position (e.g., check point 206) for the motion vector has been determined. However, as will be described below, the present fine-granular computational-complexity scalable motion estimation technique may stop at any pass, thereby providing scalability. In addition, the motion estimation technique may stop after a different number of passes for different macroblocks.

Figure 3:
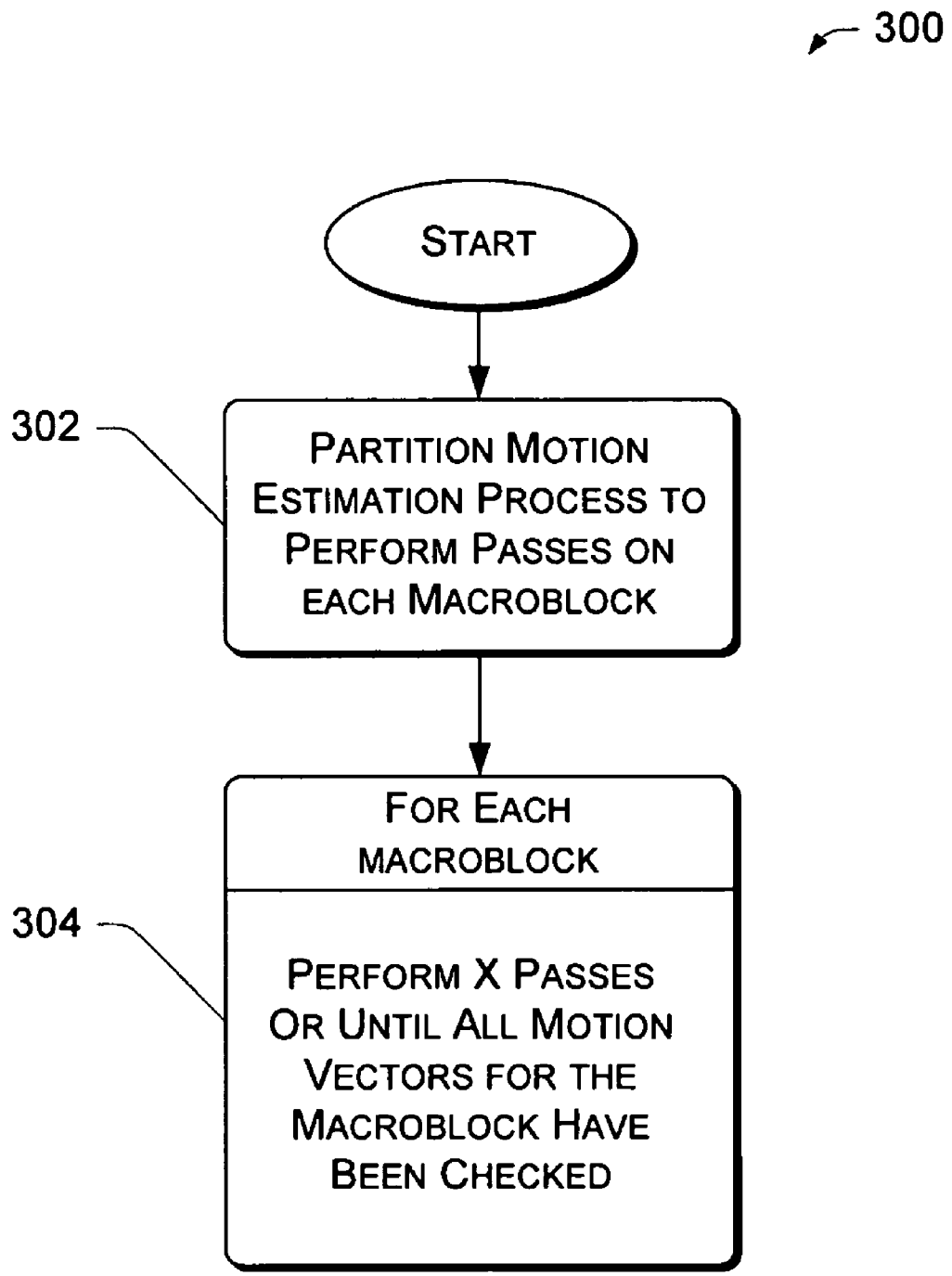
FIG. 3 is a flow diagram illustrating one implementation of a fine-granular computational-complexity scalable motion estimation process.

FIG. 3 is a flow diagram illustrating one implementation of a fine-granular computational-complexity scalable motion estimation process 300. For discussion purposes, the process 300 is described with reference to the architecture 100 shown in FIG. 1. It is noted that the process 300 may be implemented in other environments and by other devices and architectures. At block 302, the motion estimation process is partitioned to perform passes on each macroblock. Therefore, instead of determining a motion vector for one macroblock and then proceeding to the next macroblock to determine a motion vector, the present motion estimation process performs a pass for each macroblock. Processing continues at block 304.

At block 304, the search for the best motion vector is performed for X number of passes for each macroblock. If the best motion vector is located for one of the macroblocks before performing all X passes, the motion estimation process stops performing passes for that particular macroblock. Therefore, the predefined number X may be set based on the computation power available in the device. In this embodiment, each macroblock has the same opportunity to refine its motion vectors.

Figure 4:
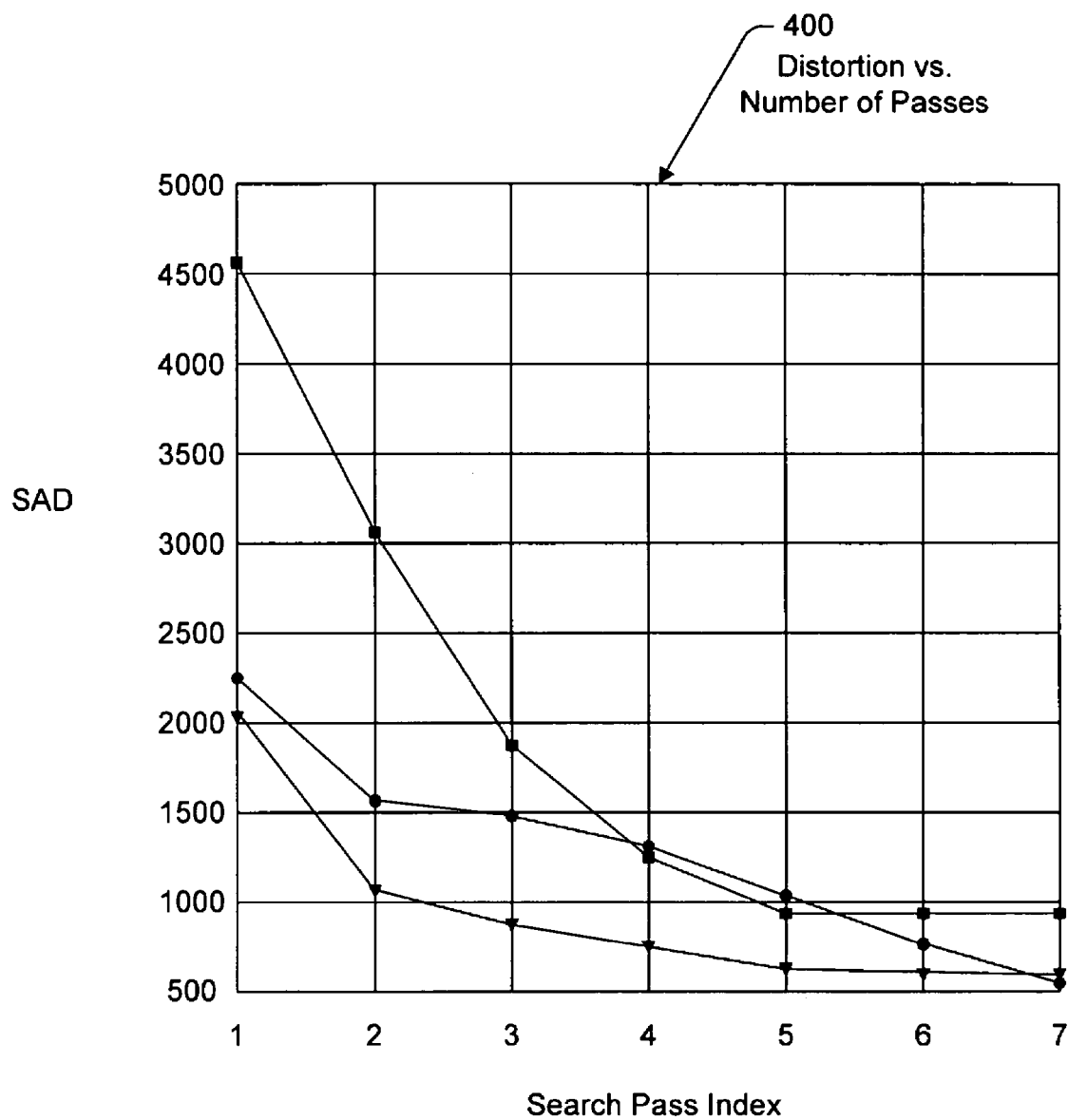
FIG. 4 is a graph illustrating the distortion of several macroblocks after stopping the motion estimation at various passes using the process shown in FIG. 3.
Figure 4:
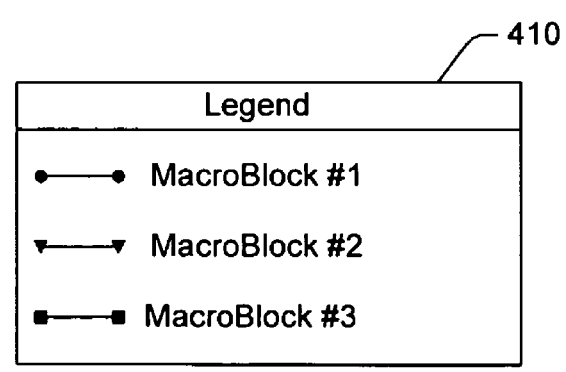

FIG. 4 is a graph 400 illustrating the distortion of several macroblocks after stopping the motion estimation at various passes. As shown in legend 410, there are three macroblocks represented in graph 400. Each macroblock is partitioned into seven passes (x-axis). As one can see, different passes for different macroblocks yield different distortion reduction. For example, in pass one, the distortion reduction for macroblock #3 is almost 1500. In comparison, the distortion reduction for macroblock #1 is only about 600. While this implementation provides scalability, the outcome may still have considerable distortion for certain macroblocks. Therefore, in another implementation, the motion estimation process determines how many passes to perform on each macroblock to get the best distortion reduction for each macroblock. Using FIG. 4 as an example, this implementation may choose to perform three passes on macroblock #3 before performing any passes on macroblocks #1 and #2. Then it may perform a pass on macroblock #2 and so on until the computational power of the device has been consumed for this particular frame.

Figure 5:
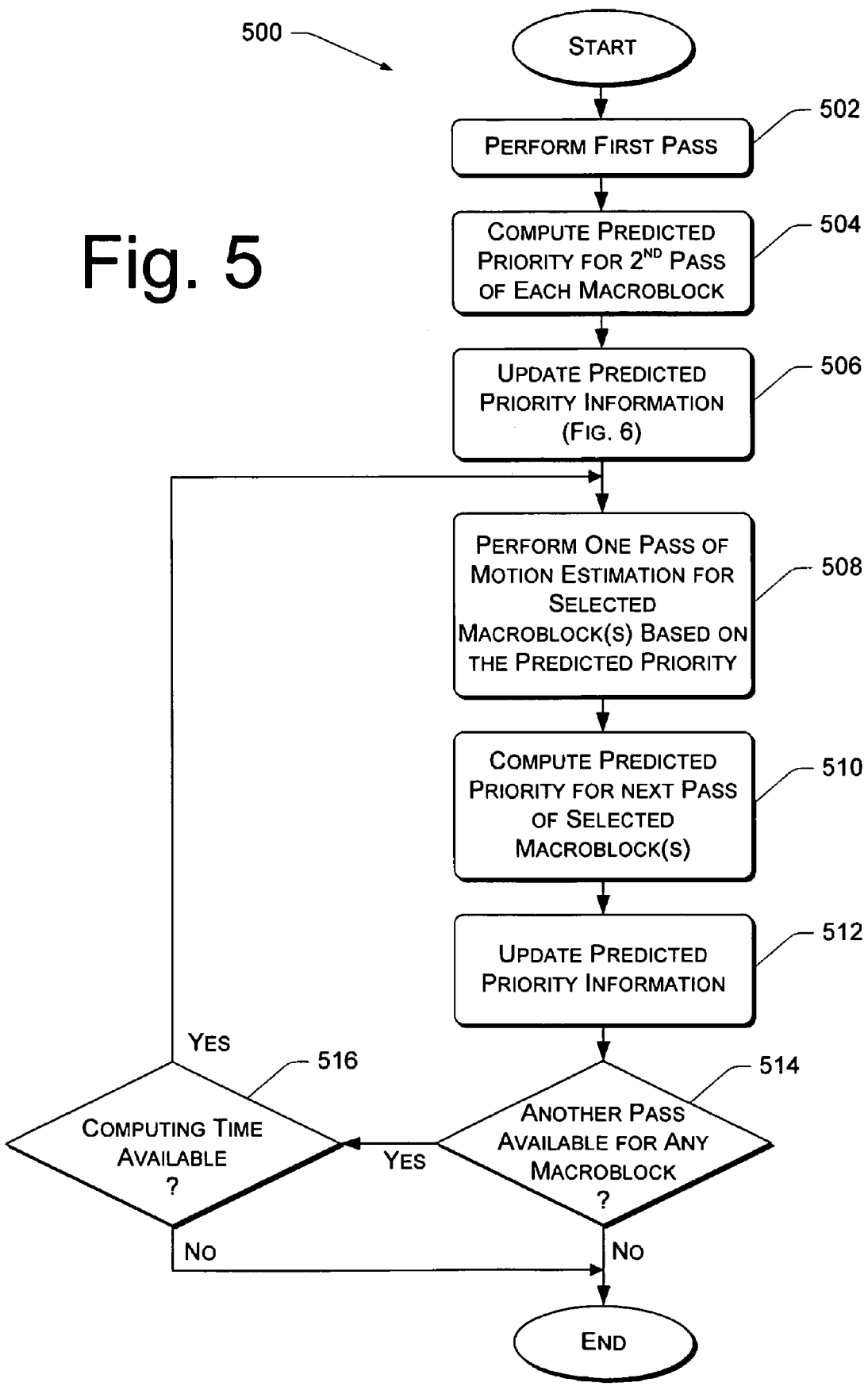
FIG. 5 is a flow diagram illustrating another implementation of a fine-granular computation-complexity scalable motion estimation process using predicted priority information.

FIG. 5 is a flow diagram illustrating this other implementation of a fine-granular computation-complexity scalable motion estimation process. While it would be easy to determine which passes to perform on which macroblocks if the distortion reduction versus number of passes was already known as shown in FIG. 4, this information is not available during real-time processing until after performing all the passes. Therefore, the present motion estimation process 500 uses predicted priority information to determine which passes to perform on which macroblocks. For discussion purposes, the process 500 is described with reference to the architecture 100 shown in FIG. 1. It is noted that the process 500 may be implemented in other environments and by other devices and architectures.

In overview, process 500 uses a priority function to predict which macroblock should have a pass performed on it. The priority function represents the distortion reduction efficiency of each pass. The predicted priority computed for each macroblock is then used to effectively allocate computational resources in a progressive manner. Thus, the motion estimation process may be stopped at any time with a progressively improved performance. This allows scalability. The proposed motion estimation process may be integrated with many existing fast motion estimation techniques, such as the new three-step search, the diamond search, the circular zonal search, and the predictive algorithm.

One embodiment for the priority prediction function is as follows:

$$\hat{P}_i(j) = \begin{cases} \infty & \text{if } j=1 \\ \dfrac{\alpha \times SAD_i(j-1)}{N_i(j)} & \text{if } j=2 \\ \min\left(\beta \times P_i(j-1), \dfrac{\alpha \times SAD_i(j-1)}{N_i(j)}\right) & \text{else} \end{cases} \quad \text{eq. (1)}$$

This priority prediction function does not require complex computations and can efficiently predict the distortion reduction efficiency for a pass. In equation 1, i represents the macroblock index, j represents the pass index, $\hat{P}_i(j)$ represents the predicted priority of the ith macroblock on the jth pass, and $N_i(j)$ represents the number of checked motion vectors of the ith macroblock in the jth pass. $N_i(j)$ can be determined after the j−1 pass and represents the consumed time since the computing time for each candidate motion vector is invariant (i.e., the distortion calculation is of constant complexity).

As described in FIG. 2, once the best motion vector for a pass is determined, the motion estimation process determines which other check points should be checked. These other check points then determine $N_i(j)$. However, the distortion reduction of the ith block for pass j can only be determined after performing the jth pass. Therefore, in equation 1, the predicted distortion reduction of the ith macroblock in the second pass (j=2) is obtained from the current sum of differences, $SAD_i(j-1)$, scaled down by a pre-determined factor α. For passes greater than 2, the predicted priority is the minimum of two terms. The first term is the actual priority of the previous pass, $P_i(j-1)$, scaled down by a pre-determined factor β. The second term is current sum of differences, $SAD_i(j-1)$, scaled down by a pre-determined factor α, as described above for pass j=2. The first term is used to limit the priority when $SAD_i(j-1)$ is very large. For example, in some cases the distortion is large but its reduction is small (i.e., the actual distortion reduction efficiency is poor). For these cases, simply using the second term will result in assigning a high priority to these macroblocks, which is far from the actual priority.

Equation 1 assumes that the distortion reduction efficiency is convex for any motion estimation process. However, because it is not always convex in practice, the present motion estimation process may add an additional priority check $\hat{P}_i^*(j)$. The following equation is one embodiment for this additional priority check $\hat{P}_i^*(j)$:

$$\hat{P}_i^*(j) = \max\left(\hat{P}_i(j), \frac{SAD_i(j-1) \times \gamma^K}{N_i(j)}\right) \quad \text{eq. (2)}$$

This additional priority check handles situations where subsequent passes will not reduce distortion efficiently, referred to as an inefficient pass. After a certain number of these inefficient passes, the priority of these inefficient passes is determined and then a low priority is applied to the macroblock so that only if there is sufficient computation power will additional motion estimation occur for the macroblock. Thus, the additional priority check takes the maximum of the predicted priority for the jth pass $\hat{P}_i(j)$ and the current SAD scaled down by a predetermined scaling factor $\gamma^K$ and divided by the number of motion vectors for the jth pass $N_i(j)$. In the predetermined scaling factor $\gamma^K$, K denotes the number of consecutive inefficient passes prior to the current pass. The assumption for equation 2 is that if consecutive inefficient passes are detected for a certain macroblock, it is believed that a global or near-global minimum is found. Therefore, a low priority is set for the macroblock.

In one embodiment, the predetermined scaling factors α, β, and γ may be set at ¼, 0.95, and ⅛, respectively. However, β may also be calculated using a probability density function as follows:

$$\beta = \int_0^\infty x \cdot H(x) \cdot dx \quad \text{eq. (3)}$$

where $H\left(\frac{P_i(j)}{P_i(j-1)}\right)$.

In addition, β may be either calculated beforehand or updated frame by frame.

Equations 1 and 2 are now used in describing the predicted priority process 500 in FIG. 5. At block 502, the first pass for each macroblock is performed because each macroblock's predicted priority is set at infinity as shown in equation 1 where j=1. This is done because there is no knowledge about each macroblock at the first pass. Therefore, the first pass is performed for each macroblock to obtain the sum of absolute difference (SAD) for the macroblock based on the prior frame. Processing continues at block 504.

At block 504, the predicted priority for each macroblock is computed for the second pass. As shown in equation 1, the predicted priority is based on the sum of absolute differences (SAD) calculated for the first pass (j=1) in block 502 scaled down by the pre-determined factor α and divided by the number of motion vectors for the second pass. Processing continues at block 506.

At block 506, the predicted priority is stored as predicted priority information. Briefly, described later in more detail in conjunction with FIG. 6, the predicted priority information provides a storage mechanism that allows the efficient retrieval of the priority information so that the present motion estimation technique may allocate computation time to macroblocks that are in greater need of reducing their distortion. Processing continues at block 508.

At block 508, one or more macroblocks are selected based on their predicted priority obtained from the predicted priority information. One pass is performed for each of the selected macroblocks. This pass determines the best motion vector in the pass. Processing continues at block 510.

At block 510, the predicted priority for the next pass (j>2) of the selected macroblocks is computed. As shown in equation 1, the calculation for the predicted priority determines the minimum of the two terms discussed above. In addition, equation 2 may be performed as an additional priority check. Processing continues at block 512.

At block 512, the predicted priority information is updated with the new predicted priority for each of the selected macroblocks. Processing continues at decision block 514.

At decision block 514, a determination is made whether any of the macroblocks have another pass available. Depending on the distortion of the frame and the computational power available, the present motion estimation may achieve the same results as traditional motion estimation techniques if all the passes for each macroblock are exhausted and the best motion vector has been determined for each macroblock. Therefore, decision block 514 determines whether this is the case. This may be determined by recognizing that all of the checking points have been covered or that the distortion is below a pre-defined threshold. If there are no more passes for any of the macroblocks for this frame, motion estimation for this frame is complete. Otherwise, processing continues at decision block 516.

At decision block 516, a determination is made whether there is computing time available to perform another pass. As mentioned above, mobile devices may not have sufficient computation power and/or battery life to perform all the passes needed to obtain the best motion vector for each macroblock for each frame. Instead, because the time to check for motion vectors is constant, process 500 may set a specific number of motion vectors to check per frame in order to limit the consumption of battery and computation power. Therefore, block 516 determines whether the specific number of motion vectors has already been checked. If the specified number of motion vectors has been checked, motion estimation for this frame is complete. Otherwise, processing loops back to block 508 to select the next macroblocks for performing another pass. This continues until either all the motion vectors for each macroblock have been checked or the computation limitation has been reached.

Figure 6:
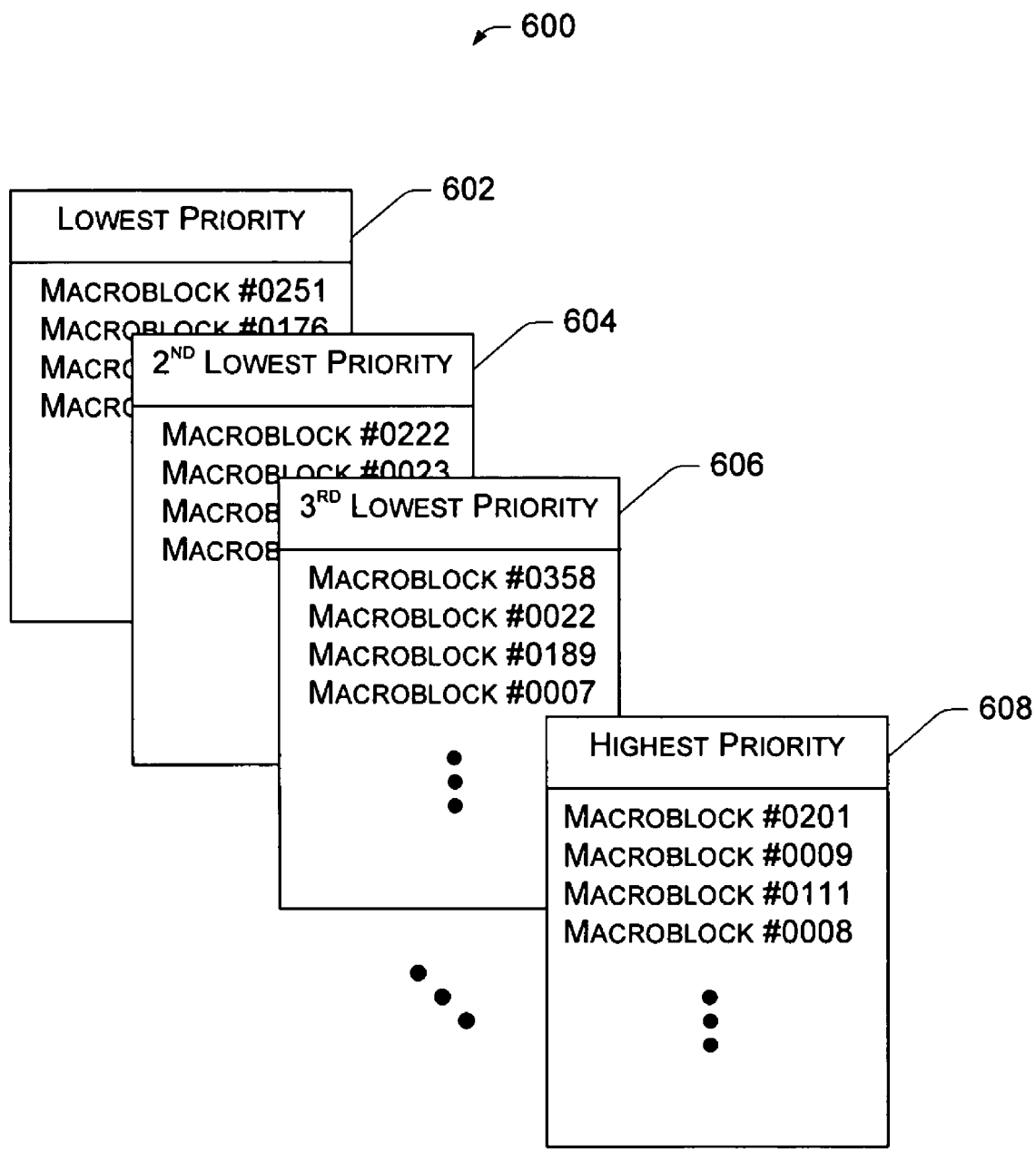
FIG. 6 is a graphical representation of one embodiment for the predicted priority information suitable for use in FIG. 5.

FIG. 6 is a graphical representation of one embodiment for the predicted priority information suitable for use in FIG. 5. As mentioned above, it is desirable to have the predicted priority information structured in a manner such that the motion estimation process can easily and efficiently identify the macroblock or macroblocks that should have another pass performed on them. In one embodiment, the predicted priority information 600 is separated into several sub-tables (e.g., sub-tables 602, 604, 606, and 608). Each sub-table is associated with a different range of predicted priorities. In order to decrease computation, these sub-tables may not be sorted, but rather have Z number of entries where Z corresponds to the number of macroblocks in each frame. Each macroblock's predicted priority is then added in the sub-table that corresponds to its entry. The corresponding entries in the other sub-tables may be set to a default value indicating that the macroblock is not within that table. The sub-tables may not necessarily have the same range for their different priority ranges. For example, the range for the highest priority sub-table 608 may cover a smaller range of values to minimize searching for the one with the highest priority and/or minimize the number of macroblocks to select when each macroblock belonging to the highest prioritized sub-table are identified for performing another pass. One will note that the predicted priority information may be structured in various other manners without departing from the claimed invention.

Figure 7:
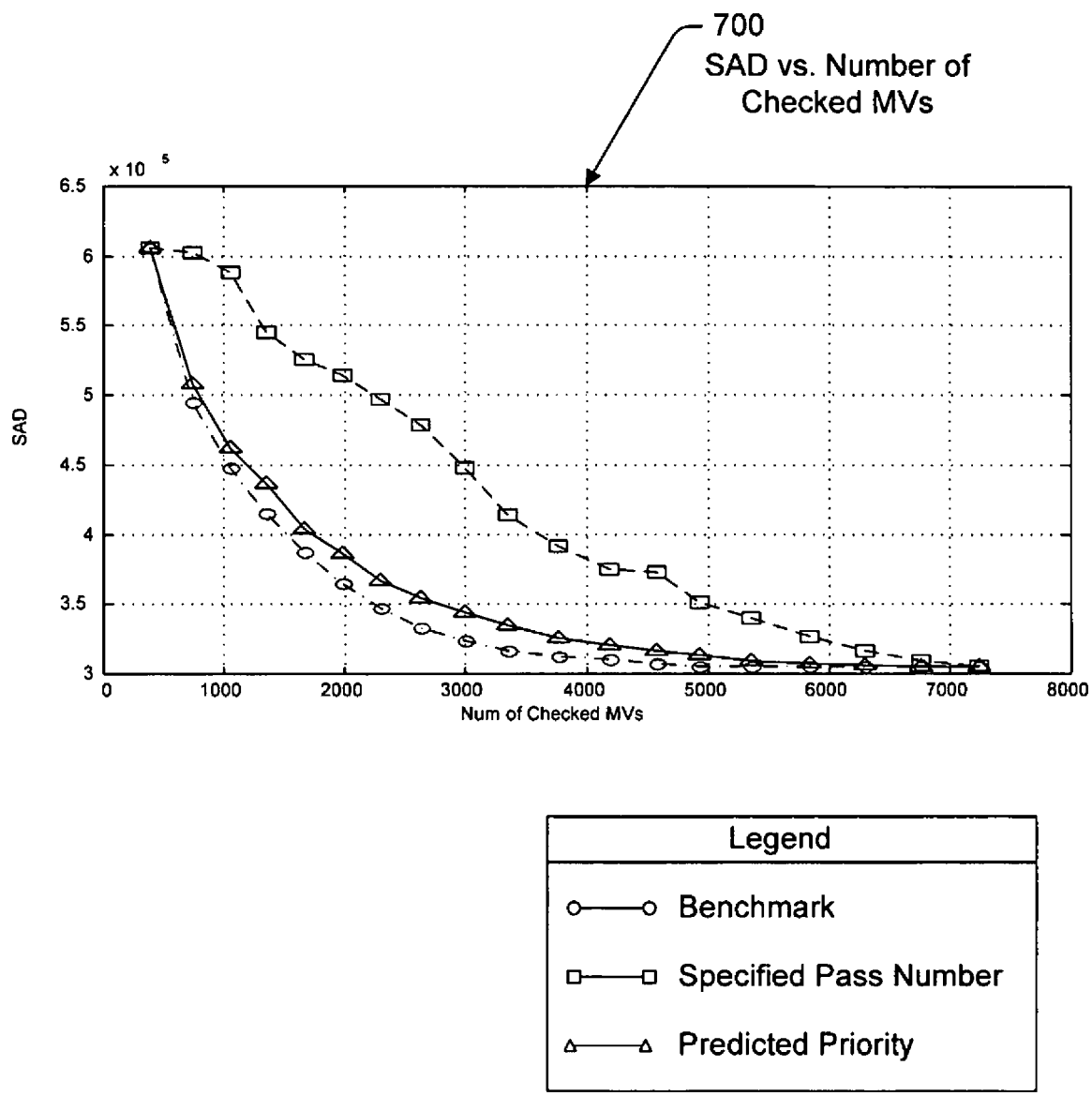
FIG. 7 is a comparison chart of two implementations of the present fine-granular computation-complexity scalable motion estimation along with a benchmark.

FIG. 7 is a comparison chart 700 of two implementations of the present fine-granular computation-complexity scalable motion estimation along with a benchmark. Comparison chart 700 illustrates the distortion reduction versus the number of checked motion vectors. The three lines represent a benchmark, a specified pass number, and a predicted priority. The specified pass number and the predicted priority are implementations of the present motion estimation technique. The specified pass number corresponds to the process illustrated in FIG. 3 where each macroblock has the same number of passes performed on it. The predicted priority corresponds to the process illustrated in FIG. 5 where the passes are allocated based on the predicted priority for each macroblock. The benchmark assumes that the priority is known beforehand and the passes are allocated based on these know priorities. Therefore, the benchmark serves as a performance upper bound since the priority needs to be predicted in practice.

The specified pass number implementation has considerable distortion until the number of checked motion vectors is nearly exhausted. However, the predicted priority implementation provides distortion reduction that is nearly consistent with the benchmark. Of particular interest is the ability to stop the motion estimation process anywhere along the predicted priority line, such as after 5000 motion vectors have been checked. By so doing, potentially over 2000 motion vectors do not need to be checked with only a minimal improvement in the distortion reduction. As mentioned earlier, this allows the present motion estimation technique to operate on various devices with varying computational resources.

Figure 8:
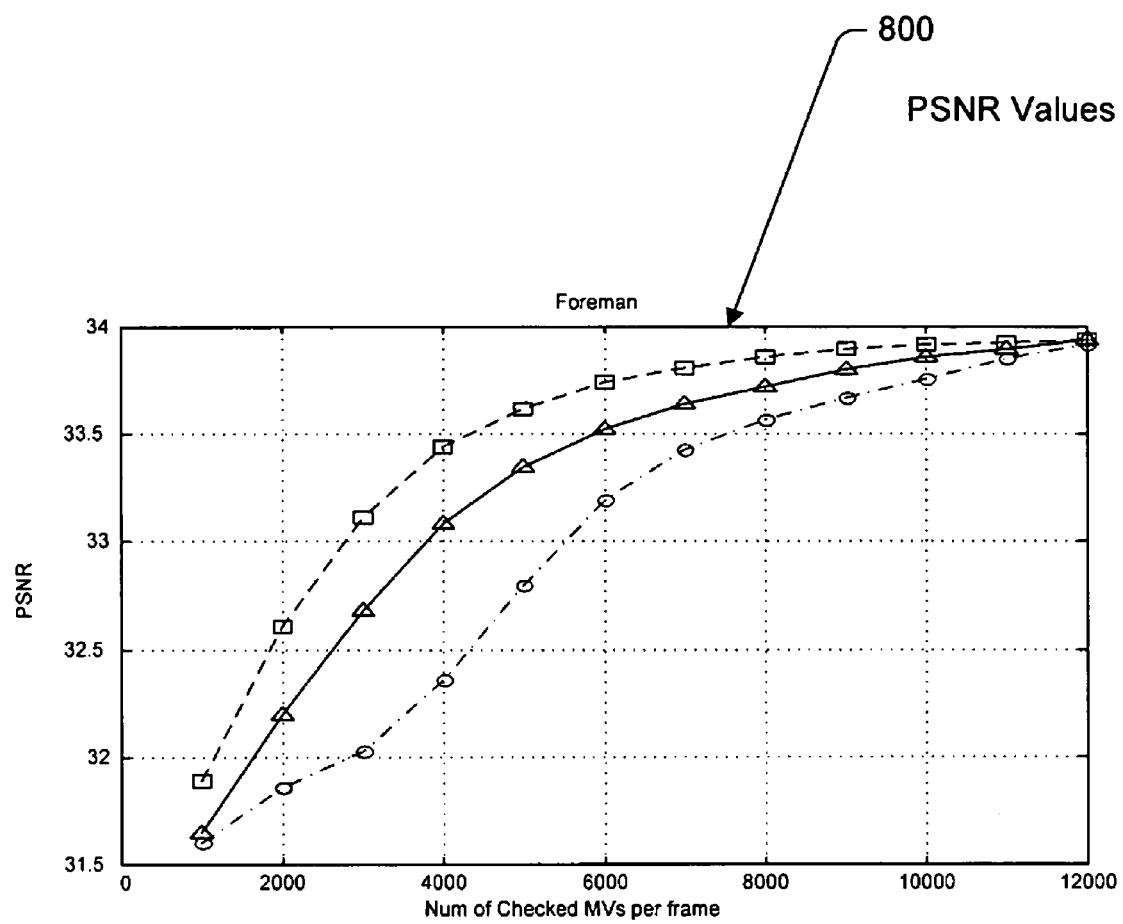
FIG. 8 is a comparison chart of two implementations of the present fine-granular computation-complexity scalable motion estimation along with a benchmark that illustrates PSNR values for a foreman pattern.
Figure 8:
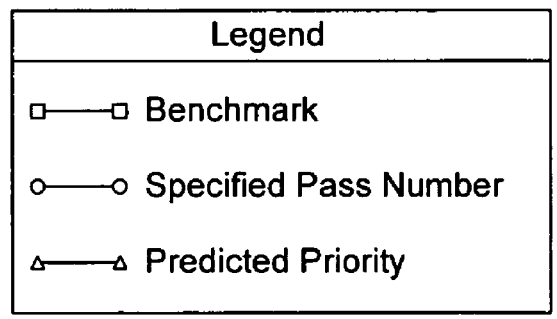

FIG. 8 is a comparison chart of two implementations of the present fine-granular computation-complexity scalable motion estimation along with a benchmark that illustrates PSNR values for a foreman pattern. Comparison chart 800 illustrates the PSNR versus the number of checked motion vectors in a foreman series. Again, as explained above, there are three lines that represent a benchmark, a specified pass number, and a predicted priority. The specified pass number took more checked motion vectors to achieve satisfactory results. However, the predicted priority implementation tracked the benchmark with a slight dB loss. Thus, the predicted priority implementation is effective as a scalable motion estimation. In addition, because the encoder can stop motion vector prediction at any point, the encoder can easily adapt to the limited/varying computational resources with only a slight performance loss.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more processors to perform a method for coding video data using motion estimation, the method comprising:
    a) identifying a macroblock out of a plurality of macroblocks, the plurality of macroblocks representing a frame, wherein the identifying the macroblock is based on a predicted priority for the macroblock;
    b) performing a first pass on the macroblock, the first pass being configured to check one set of candidate motion vectors for the macroblock and to determine a new starting point for a next pass on the macroblock during processing of a same frame;
    repeating steps a) and b) until a best motion vector is identified for each macroblock within the frame or a computation limit associated with a device performing the passes has been reached; and
    determining the predicted priority for a next pass of each macroblock by multiplying a predetermined scaling factor by a sum of absolute differences determined in the first pass and dividing a product by a number of candidate motion vectors in the set for the next pass.

2. The method as recited in claim 1, wherein identifying the macroblock comprises identifying each of the plurality of macroblocks before identifying one of the previously identified macroblocks again.

3. The method as recited in claim 1, wherein the computation limit specifies a predetermined number of passes to perform on each of the plurality of macroblocks.

4. The method as recited in claim 3, wherein the predefined number is equal for each macroblock.

5. The method as recited in claim 1, wherein the predicted priority for the first pass of each macroblock ensures that at least one pass is performed for each macroblock.

6. The method as recited in claim 1, wherein the predicted priority for each macroblock is stored in one of a plurality of sub-tables, each sub-table storing a different range of predicted priority values.

7. The method as recited in claim 1, wherein the set of candidate motion vectors is determined using at least one of a new three-step search, a diamond search, a circular zonal search, or a predictive search.

8. The method as recited in claim 1, wherein the computation limit specifies a predetermined number of candidate motion vectors to check.

9. One or more processors to perform a method for coding video data using motion estimation, the method comprising:
    identifying a macroblock from a plurality of macroblocks, the plurality of macroblocks representing a frame, wherein identifying the macroblock is based on a predicted priority for the macroblock;
    performing a pass on a macroblock, the pass being configured to check one set of candidate motion vectors for the macroblock and to determine a new starting point for a next pass on the macroblock during processing of a same frame;
    repeating the identifying the macroblock and repeating the performing the pass until a best motion vector is identified for each macroblock within the frame or a computation limit associated with a device performing the passes has been reached;
    determining the predicted priority for the next pass of the macroblock; and
    determining the predicted priority for passes after a second pass by taking a minimum of two minimum terms:
        a first minimum term determined by multiplying a predetermined scaling factor by a sum of absolute differences determined in the pass and dividing that product by a number of candidate motion vectors in the set for the next pass; and
        a second minimum term determined by multiplying a second predetermined scaling factor by an actual priority of a preceding pass for the macroblock.

10. The method as recited in claim 9, wherein the predicted priority is further limited to a maximum by two maximum terms:

a first maximum term comprises the minimum of the two minimum terms; and a second maximum term comprising a third predetermined scaling factor multiplied by the sum of absolute differences determined in the pass and dividing that product by a number of candidate motion vectors in the set for the next pass, the third predetermined scaling factor comprising a scaling factor raised to a number denoting the number of consecutive inefficient passes prior to a current pass, where inefficient passes are passes having an actual priority below a certain value.

11. The method as recited in claim 9, wherein the identifying the macroblock includes identifying each of the plurality of macroblocks before identifying one of the previously identified macroblocks again.

12. The method as recited in claim 9, wherein the computation limit specifies a predetermined number of passes to perform on each of the plurality of macroblocks.

13. The method as recited in claim 12, wherein the predefined number of passes is equal for each macroblock.

14. The method as recited in claim 9, wherein the predicted priority for the first pass of each macroblock ensures that at least one pass is performed for each macroblock.

15. The method as recited in claim 9, wherein the predicted priority for the second pass of each macroblock is determined by multiplying a predetermined scaling factor by a sum of absolute differences determined in the pass and dividing that product by a number of candidate motion vectors in the set for the next pass.

16. A media distribution system comprising:

a server having a processor to execute instructions for:

identifying a macroblock out of a plurality of macroblocks, the plurality of macroblocks representing a frame, wherein identifying the macroblock is based on a predicted priority for the macroblock;

performing an initial pass on the macroblock, the initial pass being configured to check one set of candidate motion vectors for the macroblock and to determine a new starting point for a next pass on the macroblock during processing of a same frame;

repeating the identifying and performing acts until a best motion vector is identified for each macroblock within the frame or a computation limit associated with a device performing the passes has been reached; and determining the predicted priority for the next pass of each macroblock by multiplying a predetermined scaling factor by a sum of absolute differences determined in the initial pass and dividing that product by a number of candidate motion vectors in a set for the next pass.

17. The system as recited in claim 16, wherein identifying the macroblock comprises identifying each of the plurality of macroblocks before identifying one of the previously identified macroblocks again.

18. The system as recited in claim 16, wherein the computation limit specifies a predetermined number of passes to perform on each of the plurality of macroblocks.

* * * * *